United States Patent Office 3,096,254
Patented July 2, 1963

3,096,254
GEOMICROBIOLOGICAL PROSPECTING
Donald O. Hitzman, Bartlesville, Okla., assignor to Phillips Petroleum Company, a corporation of Delaware
No Drawing. Filed Nov. 4, 1960, Ser. No. 66,940
5 Claims. (Cl. 195—103.5)

This invention relates to microbiological prospecting for subterranean oil and gas deposits.

It is an established bacteriological fact that bacteria are adaptive organisms and serve as indicators for specific environmental conditions. Microbiological prospecting is based on the theory that hydrocarbon gases have been continually escaping from oil and gas deposits and pervade the surface soils. The gases permeate and provide an atmosphere in the soil below surface contamination, which atmosphere, in the past, has been selective in determining the microbiological growth which can exist in the atmosphere or in environment. This selectivity results in a predominant biological population in the soil which utilizes these hydrocarbon gases and which can grow only in their presence. The presence of these environmental-selective microorganisms is indicative of the presence of the hydrocarbon gases in the soil, and these, in turn, indicate the presence of subterranean oil and gas deposits.

Samples of soil taken over a hydrocarbon bearing formation will contain more hydrocarbon consuming microorganisms than samples of soil taken from a "dry" area. Moreover, such soil samples over a hydrocarbon bearing formation will also contain a much higher percentage of hydrocarbon indicating organisms which are heat resistant, perhaps as high as 95 percent; while soil samples taken from a normal or "dry" area will have a much lower percentage of heat resistant microorganisms, perhaps no higher than 25 percent. The techniques used in geomicrobiological prospecting are then selective in isolating these hydrocarbon-indicating organisms. For a detailed discussion of one such technique, see U.S. Patent No. 2,880,142, patented March 31, 1959.

One critical problem encountered in microbiological prospecting arises from the unavoidable time lag between collection of the soil samples in the field and testing them for the presence of hydrocarbon-indicating bacteria, usually in a laboratory. The vegetative non-hydrocarbon-indicating forms, which are present to an extent in the soil samples taken from over a hydrocarbon bearing formation, continue to grow in the interval between collection and analysis. Thus, their growth tends to mask the presence and concentration of the hydrocarbon-indicating types of bacteria. The net effect is to increase the difficulty of isolation of microorganisms which are the indicators of hydrocarbon deposits.

I have discovered that the isolation of soil types of microorganisms, which are indicators of hydrocarbon deposits, can be facilitated by heating the soil or soil suspension to kill off substantially all vegetative cells. There remains the more resistant forms which are predominantly hydrocarbon-indicating microorganisms since certain hydrocarbon-indicating microorganisms have forms, most commonly the spore form, which are more resistant to heat than most normal soil types of bacteria. Although this technique will leave viable other types of heat resistant, non-hydrocarbon-indicating spores, the soil from above an oil deposit will contain a higher proportional number of heat resistant, hydrocarbon-indicating microorganisms, and thus indicate the location of the deposit. This method will permit soil samples to be collected; heated to prevent bacterial change in the sample by overgrowth of non-hydrocarbon-indicating microorganisms in the vegetative form; and so enable the sample to be stored for longer periods of time before testing without the soil count changing.

An object of this invention is to provide a method of microbiological prospecting for subterranean oil and gas deposits.

Another object of this invention is to provide a method of microbiological prospecting for subterranean oil and gas deposits wherein samples of soil from the area under investigation are subjected to a technique for the improved isolation of the hydrocarbon-indicating microorganisms present at the time of sampling.

Still another object of this invention is to provide a method of microbiological prospecting for subterranean oil and gas deposits wherein one of the sources of error common to the methods of the prior art are eliminated.

Yet another object of this invention is to facilitate the isolation of microorganisms which are indicators of hydrocarbon deposits by killing off the vegetative forms present in the soil samples while leaving viable the more resistant forms of hydrocarbon-indicating organisms.

Other objects and advantages of this invention will become apparent to those skilled in the art from a study of the accompanying disclosure and appended claims.

Thus, according to this invention, there is provided a method of prospecting for subterranean petroleum hydrocarbon deposits, which comprises: subjecting samples of soil from spaced points in the area under investigation to heat for a period of time sufficient to kill off substantially all of the vegetative forms of said microorganisms, while leaving viable the more resistant forms thereof; storing said heat-treated soil samples for any necessary period of time; and carrying out conventional analysis techniques on the said samples for evidence of hydrocarbon-consuming types of microorganism growth.

It is to be noted that the heat to which the microorganisms are subjected is one to be supplied at a carefully controlled temperature, most conveniently by a heated water bath. Temperatures to kill off said vegetable cells can range from 40 to 75° C., with between 50–65° C., the preferred range. Heating times preferably range between 2 and 60 minutes.

Soil samples are secured from the area under investigation from different depths below the surface, depending to some extent upon the moisture content of the soil and the season of the year. In any event, it is preferred that the soil sample be taken at a sufficient depth below the surface to avoid surface contamination. Depths from six inches to three feet are usually preferred, with depths from two to three feet being more preferred. In taking the samples, it is important that the soil sample be a sample of undisturbed soil at the desired depth. One convenient method of sampling is to dig a hole with the aid of an ordinary posthole digger to approximately the desired depth and then by the use of a hand auger, take a sample of undisturbed soil from the side of the hole at the desired depth. The area under investigation is usually sampled according to a prearranged plot of said area.

Obviously any desired plot can be employed. At each sampling station, two holes ten feet apart are dug and the samples collected. The samples are preferably placed in suitable sterile glass containers.

Usually, in field operations, one hundred grams of soil from each hole are blended to give a two hundred gram sample for each sampling station. The two hundred gram sample of soil is then blended in a Waring Blendor or other suitable mixing device for approximately one minute with 1000 milliliters of a typical sterile mineral medium having the following composition:

MINERAL MEDIUM NO. 1

| | | |
|---|---|---|
| $NH_4NO_3$ | grams | 1 |
| $MgSO_4$ | do | 0.1 |
| $K_2HPO_4$ | do | 0.5 |
| $CaSO_4$ | do | 0.1 |
| Distilled water | ml | 1000 |

The mineral medium which is used in preparing the above described soil suspensions and dilutions can be varied widely as is well known to bacteriologists.

The pH of the soil suspension is then adjusted to 7 while the suspension is being agitated. One milliliter of the soil suspension is then added to 100 milliliters of said sterile mineral medium to give a 1 to 100 dilution soil suspension. One milliliter of the 1 to 100 dilution is then added to 100 milliliters of the mineral medium to give a 1 to 10,000 dilution soil suspension.

One hundred milliliters of the resulting suspension are transferred into each of two bottles. One bottle is left at room temperature, and the other is carefully heated in the range from 40 to 75° C. for up to 60 minutes. Alternatively, the soil suspensions can be heated prior to their dilution, or even prior to the soil samples being dispersed in the mineral medium. Experience gained with sampling particular types of soil will dictate the point in time of the heating step to give the most accurate and consistent results.

Duplicate cultures at the desired dilutions are prepared from each of the 1 to 100 dilution soil suspension and the 1 to 10,000 dilution soil suspension by incorporating aliquot portions of each suspension into a culture medium, such as an agar medium, in a Petri dish. A suitable agar medium consists of:

| | | |
|---|---|---|
| $NH_4NO_3$ | grams | 1.0 |
| $MgSO_4$ | do | 0.1 |
| $K_2HPO_4$ | do | 0.5 |
| $CaSO_4$ | do | 0.1 |
| Agar | do | 15.0 |
| Distilled water | ml | 1000 |

In an alternative procedure, a normally toxic organic liquid, such as a normal aliphatic alcohol, is incorporated into the agar medium in varying amounts as discussed hereafter and serves as the sole substrate or nutrient in the culture medium.

The prepared plates are allowed to solidify and are then incubated in an inverted position at about 37° C. for 7 days after which time they are removed from the incubator and the colonies which have developed are counted.

The amount of alcohol used in the agar medium varies with the kind of alcohol which is to be used. For example, when the alcohol is methanol or ethanol, sufficient alcohol is added to the aqueous agar medium so as to give a finished medium which is 2.5 percent by volume of alcohol. When the alcohol is n-propanol, sufficient alcohol is added to the aqueous agar medium to give a finished medium which contains 1.5 percent by volume of alcohol. When the alcohol is 1-butanol, sufficient alcohol is incorporated in the agar medium to give a finished medium which contains 0.5 percent by volume of alcohol.

Any number of cultures can be prepared. However, as a general rule, I have found it convenient to prepare at least two cultures at two different dilutions. For example, two dishes are prepared at a 1 to 1000 dilution and two dishes are prepared at the 1 to 10,000 dilution. Usually, when hydrocarbon-consuming microorganisms are present, at least one of the dishes will develop a number of colonies which is within the counting range. The colonies in the culture dishes which develop colonies within the counting range are then counted and averaged to give the number of colonies for the sample being tested.

The foregoing procedure for carrying out this invention is preferred on a commercial scale. A special series of runs was undertaken in the laboratory to demonstrate the operability of this invention.

EXAMPLE I

Suspensions of samples of three organisms were prepared and used in the following study.

(A) Pseudomonas type: A pure stock culture of Pseudomonas, which had been stored in the refrigerator, was used for this example.

(B) Bacillus type: *Bacillus macerans* (ATCC 1068) pure culture was employed. The culture was old and consisted almost entirely of spore form.

(C) Organisms isolated from alcohol selective plates and were streaked on a similar medium for maximum growth.

Each sample was shaken 50 times with a 100 milliliters of mineral medium, prepared as described previously, and allowed to settle. Five milliliters of each supernatant were then pipetted into two bottles of mineral medium (100 milliliters). One bottle was left at room temperature and one bottle was placed in a water bath at 60° C. The water bath level was high enough to come to the neck of the half full sample bottles. At equal time intervals, aliquots were withdrawn from the bottles, and the appropriate dilutions made. Plates were made from each dilution on two types of medium (mineral and plate count agar). Incubation was at 37° C. for seven days. Conventional plate counts were then made of the surviving organisms.

This example compared a spore-type organism (Sample B) which is heat resistant, and a vegetative non-spore forming type (Sample A), with an organism (Sample C) isolated from alcohol prospecting plates. The results (Table I) show that the vegetative type is rapidly killed by heat while there is no change in the spore type. The alcohol isolate (Sample C) has some kill, but it was more resistant than the vegetative form, while yet not a true spore form. These data were obtained from growth on plate count medium.

In alcohol medium several important observations were made. No Pseudomonas or Bacillus organisms could grow in the alcohol medium, although the alcohol isolate gave the same results as growth on plate count agar. This means that in prospecting surveys the alcohol technique will eliminate these Pseudomonas and Bacillus forms and leave only the indicator type organism. Thus, a heat exposure treatment for a short period, followed by plating the survivors on alcohol medium, will give better differentiation between survey samples, since forms of A and B, if left unheated in normal soil samples, would overgrow the hydrocarbon-indicating types and lead to difficulties in their isolation, even by the alcohol selective technique.

*Table I.—Effect of Heat on Three Types of Microorganisms, a Spore Form,* Pseudomonas, *and a Typical Isolate From Prospecting Surveys*

SAMPLE A—PSEUDOMONAS TYPE

| Exposure time, min. | Number of organisms per ml. in the presence of plate count agar at dilutions of— | | | Number of organisms per ml. in the presence of .5% butanol agar at dilutions of— | | |
|---|---|---|---|---|---|---|
| | 1–1,000 | 1–10,000 | 1–100,000 | 1–1,000 | 1–10,000 | 1–100,000 |
| 0 | 2 | 1 | 0 | 0 | 0 | 0 |
| 15 | 1 | 2 | 1 | 0 | 0 | 0 |
| 30 | 0 | 0 | 0 | 0 | 0 | 0 |
| 45 | 0 | 0 | 0 | 0 | 0 | 0 |
| 60 | 0 | 0 | 0 | 0 | 0 | 0 |
| 60, control | 6 | 0 | 0 | 0 | 0 | 0 |

SAMPLE B—BACILLUS SPORE FORM

| 0 | 11 | 3 | 0 | 0 | 0 | 0 |
|---|---|---|---|---|---|---|
| 15 | 16 | 2 | 2 | 0 | 0 | 0 |
| 30 | 14 | 1 | 0 | 0 | 0 | 0 |
| 45 | 10 | 3 | 2 | 0 | 0 | 0 |
| 60 | 16 | 1 | 0 | 0 | 0 | 0 |
| 60, control | 16 | 4 | 1 | 0 | 0 | 0 |

SAMPLE C—TYPICAL ORGANISM ISOLATED FROM PROSPECTING SURVEY

| 0 | 128 | 16 | 3 | 118 | 23 | 0 |
|---|---|---|---|---|---|---|
| 15 | 35 | 5 | 0 | 40 | 10 | 1 |
| 30 | 6 | 1 | 1 | 4 | 1 | 0 |
| 45 | 4 | 0 | 0 | 1 | 1 | 0 |
| 60 | 3 | 0 | 0 | 0 | 0 | 0 |
| 60, control | 169 | 18 | 1 | 147 | 26 | 5 | the effect of heat treatment on organisms isolated from alcohol selective plates:

(D) A suspension of microorganisms from colonies on a n-butanol containing Petri plate.

(E) 25 grams of soil from a laboratory soil column which had been exposed to a butane-air gas mixture for 109 days.

(F) 25 grams of soil from a laboratory soil column which had been exposed to air alone for 109 days.

Each soil sample was shaken 50 times with 100 milliliters of mineral medium and allowed to settle. Five milliliters of each supernatant was then pipetted into two bottles of mineral medium (100 milliliters). One bottle was left at room temperature, and one bottle was placed in a water bath at 63° C. Again, the water level was high enough to come up to the neck of the half-full sample bottles. At 0-, 5-, 10-, 15-, 30-, 45-, and 60-minute intervals, one milliliter of liquid samples were withdrawn from the bottles, and the appropriate dilutions were made. A zero and 60-minute count was made on the unheated bottle as controls. Plates were made of each dilution of the 24 samples in two media, using nutrient agar for total count, and mineral medium plus 0.5 percent normal butanol for the alcohol selective technique described in U.S. Patent 2,880,142. Incubation was at 37° C. for 7 days. Conventional plate counts were then made of the surviving organisms.

*Table II.—Counts of Microorganisms Exposed to Heat (63° C.) for Varying Periods of Time*

SAMPLE D

| Exposure time at 63° C., min. | Counts at dilutions | | | | Counts at dilutions | | | |
|---|---|---|---|---|---|---|---|---|
| | 1–100 | 1–1000 | 1–10,000 | 1–100,000 | 1–100 | 1–1000 | 1–10,000 | 1–100,000 |
| | Surviving organisms grown on .5% n-butanol mineral medium agar | | | | Surviving organisms grown on nutrient agar | | | |
| 0 | [1]TMTC | 300 | 150 | 18 | TMTC | 300 | 130 | 18 |
| 5 | TMTC | 150 | 75 | 7 | | | | |
| 10 | TMTC | 150 | 50 | 9 | TMTC | 140 | 29 | 3 |
| 15 | TMTC | 150 | 35 | 3 | 300 | 108 | 18 | 0 |
| 30 | 300 | 100 | 25 | 1 | 164 | 29 | 5 | 0 |
| 45 | 300 | 55 | | | 40 | 7 | | |
| 60 | 100 | 5 | 0 | 0 | 7 | 2 | 1 | 0 |
| Control (no heat), 60 | TMTC | 300 | 150 | 21 | TMTC | 300 | 115 | 19 |

SAMPLE E

| 0 | TMTC | 150 | 28 | 2 | [2]S | 300 | 36 | 7 |
|---|---|---|---|---|---|---|---|---|
| 5 | 300 | 75 | 2 | 1 | | | 16 | 4 |
| 10 | 300 | 50 | 2 | 1 | S | S | 30 | 2 |
| 15 | 300 | 50 | 7 | 0 | TMTC | S | S | 3 |
| 30 | 150 | 26 | 3 | 0 | S | 100 | S | |
| 45 | 150 | 100 | | | S | S | | |
| 60 | 150 | 30 | 0 | 2 | S | S | S | 4 |
| Control (no heat), 60 | TMTC | 150 | 52 | 4 | S | S | 46 | 10 |

SAMPLE F

| 0 | TMTC | 150 | 40 | 3 | S | S | 37 | 8 |
|---|---|---|---|---|---|---|---|---|
| 5 | 300 | 100 | 5 | 1 | | | 10 | 1 |
| 10 | 300 | 100 | 2 | 1 | S | S | 23 | 4 |
| 15 | 300 | 100 | 2 | 2 | S | S | 33 | 4 |
| 30 | 150 | 100 | 2 | 2 | S | S | | |
| 45 | 150 | 100 | | | S | S | 25 | 6 |
| 60 | 100 | 10 | 3 | 0 | S | S | 40 | 6 |
| Control (no heat), 60 | TMTC | 150 | 30 | 3 | S | S | | |

[1] TMTC = Too many to count.
[2] S = Spreading colonies which covers entire plate making it uncountable.

EXAMPLE II

Another set of three samples was made up to clarify the effect of heat treatment on organisms isolated from The results of exposing the soil samples to heat has been tabulated in Table II, and compared to similar samples unheated. Sample D, which is the culture from alcohol selective plates, shows a decrease in count with heat exposure. This is very noticeable when plated on nutrient agar, which normally grows many more and different types of microorganisms than when plated on the alcohol medium. Counts decreased in the alcohol medium, but not to the same extent in the same time interval.

The counts in Sample E, from a butane-air exposed soil, show a decrease in count with heating in both media. A spreading form appeared on the nutrient agar plates (probably *Bacillus cereus* which is a spore form) that prevented counting of the plates. Comparing Sample E with Sample F, the latter, an air-exposed soil, little change was indicated in the count characteristics. The greatest decrease in count occurred with a 5-minute exposure, after which a gradual drop in count occurred. This is expected since all non-resistant forms of microorganisms are rapidly killed off leaving the more resistant forms.

By comparing Sample D with E and F, the results indicate that while approximately 50 percent of Sample D was killed in 5 minutes at 63° F., a higher proportion were killed in Samples E and F (see Table II, alcohol counts at 1–10,000 dilution), indicating that some organisms grown on alcohol plates are more heat resistant since they had been preselected by the alcohol technique as being true hydrocarbon-indicating microorganisms. The data show these hydrocarbon-indicating organisms are proportionately more heat resistant than forms normally found in the soil. The ease and accuracy of their isolation and identification can be increased by employing the heating technique to eliminate non-heat resistant forms, followed by the alcohol technique to eliminate other possible heat resistant forms, which are not hydrocarbon-indicating thus allowing only hydrocarbon-indicating forms to survive.

In addition to establishing the greater heat resistance of hydrocarbon-indicating forms of microorganisms, these tests further point out that the suitability of the alcohol plates for making counts of soil samples, since counts made on nutrient agar permit many types to grow, most of which prevented counting the plates. It should also be pointed out that although some of the counts could appear on both types of media, it does not mean the same type of organisms is growing on both media. On the alcohol plates, in general, only one type of colony appeared while on the nutrient agar plates, a whole spectrum of types appeared.

As will be understood by those skilled in the art, various modifications of the invention can be made or practiced in view of the above disclosure without departing from the spirit and scope of the invention.

I claim:

1. A method of prospecting for subterranean petroleum hydrocarbon deposits which comprises collecting samples of soil from spaced points in the area under investigation, said samples containing both heat resistant and non-heat resistant forms of microorganisms; heating in the range from 40–75° C. said soil samples for a period of time ranging from 2 to 60 minutes sufficient to kill off substantially all of the non-heat resistant forms of said microorganisms while leaving viable the more heat-resistant forms thereof; forming a suspension of each of said samples in an aqueous sterile inorganic salt medium; incorporating an aliquot of each of said suspensions in individual portions of a culture medium containing a normal aliphatic alcohol having from 1 to 4 carbon atoms as the sole substrate; maintaining said portions of culture medium thus inoculated under incubating conditions for a period of time sufficient to permit growth of hydrocarbon-consuming microorganisms whose presence is indicative of subsurface petroleum hydrocarbon deposits; examining said incubated cultures for evidence of said growth; and correlating said evidence of growth with the area under investigation.

2. A method of prospecting for subterranean petroleum hydrocarbon deposits which comprises collecting samples of soil from spaced points in the area under investigation, said samples containing both heat resistant and non-heat resistant forms of microorganisms; heating in the range from 40–75° C. said soil samples for a period of time ranging from 2 to 60 minutes sufficient to kill off substantially all of the non-heat resistant forms of said microorganisms while leaving viable the more heat-resistant forms thereof; forming a suspension of each of said samples in an aqueous sterile inorganic salt medium; diluting said soil suspensions with said sterile medium; incorporating an aliquot of each of said suspensions in individual portions of a culture medium containing a normal aliphatic alcohol having from 1 to 4 carbon atoms as the sole substrate; maintaining said portions of culture medium thus inoculated under incubating conditions for a period of time sufficient to permit growth of hydrocarbon-consuming microorganisms whose presence is indicative of subsurface petroleum hydrocarbon deposits; examining said incubated cultures for evidence of said growth; and correlating said evidence of growth with the area under investigation.

3. In a method of prospecting for subterranean petroleum deposits which comprises collecting samples of soil from spaced points in the area under investigation, said samples containing both heat resistant and non-heat resistant forms of microorganisms; and analyzing the said soil samples for evidence of hydrocarbon-indicating types of microorganism growth, whose presence is indicative of subsurface petroleum deposits; the improvement which comprises subjecting said soil samples to heat in the range from 40–75° C. for a period of time ranging from 2 to 60 minutes sufficient to kill off substantially all of the non-heat resistant forms of said microorganism and leave viable the heat resistant forms of microorganisms, prior to said analyzing step.

4. A method of prospecting for subterranean petroleum hydrocarbon deposits which comprises collecting samples of soil from spaced points in the area under investigation, said samples containing both heat resistant and non-heat resistant forms of microorganisms; forming a suspension of each of said samples in an aqueous sterile inorganic salt medium; heating in the range from 40–75° C. said soil suspensions for a period of time ranging between 2 and 60 minutes sufficient to kill off substantially all of the non-heat resistant forms of said microorganisms while leaving viable the heat resistant forms thereof; and storing said heat-treated soil samples for an extended period of time until ready to carry out analysis of the same for evidence of hydrocarbon-indicating types of microorganism growth.

5. The method of prospecting for subterranean petroleum hydrocarbon deposits which comprises collecting samples of soil from spaced points in the area under investigation, said samples containing both heat resistant and non-heat resistant forms of microorganisms; heating in the range from 40–75° C. said soil samples for a period of time which ranges between 2 and 60 minutes sufficient to kill off substantially all of the non-heat resistant forms of said microorganisms while leaving viable the more heat resistant forms thereof; and storing said heat-treated soil samples for an extended period of time until ready to carry out analysis of the same for evidence of hydrocarbon-indicating types of microorganism growth.

References Cited in the file of this patent

UNITED STATES PATENTS 2,880,142    Hitzman _____ Mar. 31, 1959

OTHER REFERENCES

Davis et al.: "Microbiology in the Petroleum Industry," Bacteriologic Reviews, vol. 18, No. 4, December 1954, pp. 219–225, 195–3.02.